March 1, 1949.   C. G. ABBOTT   2,463,134
REVERSIBLE MAGNETO TESTING DEVICE
Filed April 16, 1947   2 Sheets-Sheet 1.
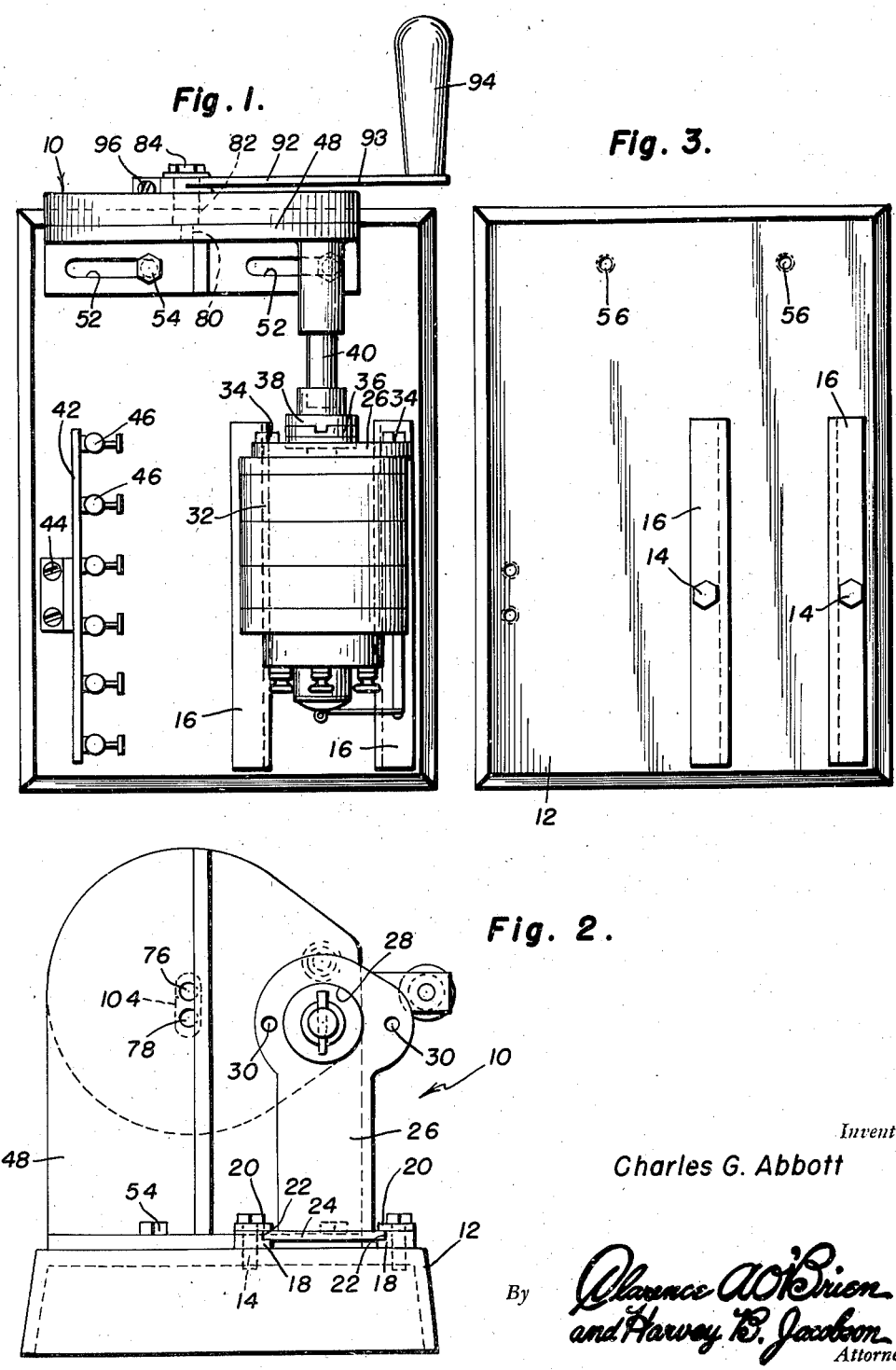
Inventor
Charles G. Abbott
By Clarence A. O'Brien
and Harvey B. Jackson
Attorneys March 1, 1949.  C. G. ABBOTT  2,463,134
REVERSIBLE MAGNETO TESTING DEVICE
Filed April 16, 1947  2 Sheets-Sheet 2
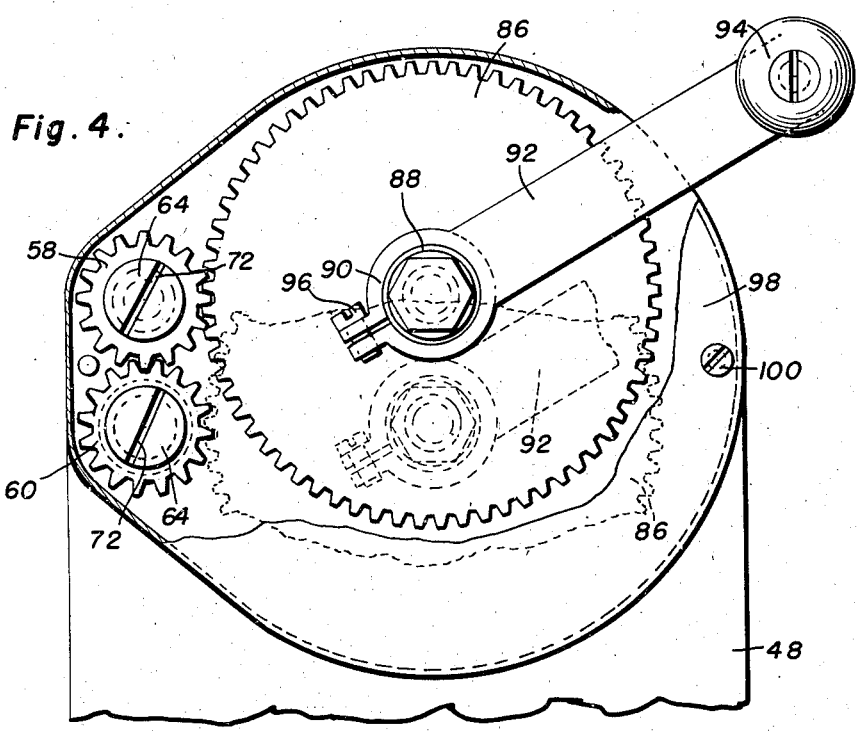
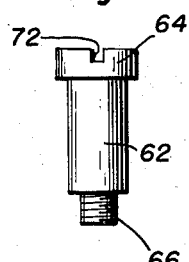
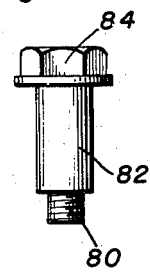
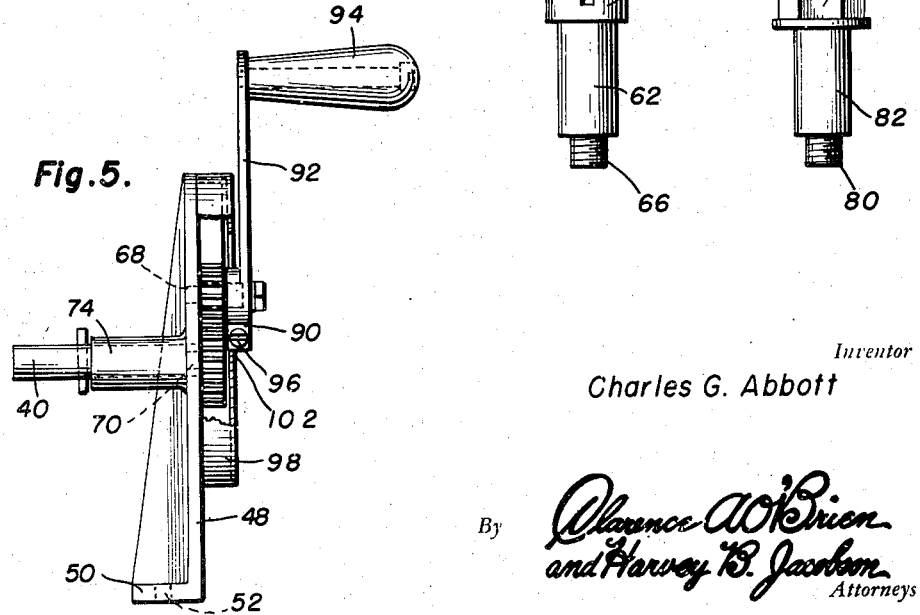
Inventor
Charles G. Abbott
By *Clarence A. O'Brien and Harvey B. Jacobson*
Attorneys Patented Mar. 1, 1949

2,463,134

UNITED STATES PATENT OFFICE 2,463,134

REVERSIBLE MAGNETO TESTING DEVICE

Charles G. Abbott, Quincy, Ill.

Application April 16, 1947, Serial No. 741,784

5 Claims. (Cl. 74—16)

1

This invention relates to novel and useful improvements in a reversible magneto testing device and more specifically pertains to a testing stand for supporting the magneto and is provided with gearing for manually rotating magnetos in a predetermined, reversible direction, in response to continuous uni-directional rotation of a handle.

The principal purpose of this invention is to provide a magneto testing stand whereby right and left hand magnetos may be selectively rotated in their predetermined directions of rotation in response to uni-directional rotation of a handle.

Further important objects of the invention reside in providing an effective device in accordance with the foregoing object, wherein improved means are provided for adjustably mounting and positioning a magneto upon the support stand; wherein readily changeable gearing is provided for imparting rotation in a predetermined direction to a magneto in response to uni-directional rotation of an operating handle; wherein the alteration in the gearing drive for reversing the direction of the rotation of a magneto may be readily effected from without the gear enclosing casing.

Additional important objects of the invention consist of providing an apparatus in conformity with the above mentioned objects, which shall be of simple construction, easily assembled and dismantled as desired, adaptable to accommodate various types of magnetos; and which shall be of simple, inexpensive and durable construction and highly efficacious for the purpose for which it is intended.

These, together with various ancillary objects of the invention which will later become apparent as the following description proceeds, are realized by this device, a preferred embodiment of which has been illustrated, by way of example only in the accompanying drawings, wherein:

Figure 1 is a top plan view of the magneto testing stand, showing a magneto supported thereon in proper position for testing;

Figure 2 is a rear end elevational view of the device shown in Figure 1, the magneto and the indicating apparatus being omitted therefrom;

Figure 3 is a top plan view of the base of the testing stand, the indicating device, magneto support and gearing support being omitted therefrom;

Figure 4 is a fragmentary front elevational view of the testing stand, parts being broken away to illustrate the construction of the gearing assembly;

Figure 5 is a side elevational view of the gearing assembly, parts of the house being broken away to indicate the position of the gearing therein;

Figure 6 is a front elevational view of a stub axle employed for some of the gearing, and;

Figure 7 is an elevational view of the stub axle employed for selectively journaling the driving gear of the assembly.

Referring now more specifically to the accompanying drawings, wherein like numerals indicate similar parts throughout the various views, attention is directed first to Figures 1-3 wherein 10 designates generally the novel testing stand forming the subject of this invention and which as shown comprises a base 12 of generally rectangular form, and which may be of any suitable material and size.

Suitably positioned upon the base and removably secured thereto as by bolts 14 or the like, are a pair of laterally spaced longitudinally extending guide rails 16 each rail consisting of a flanged bottom portion 18 with a superincumbent top portion 20, these members forming a channel 22 therebetween. The construction of the channel guide members is best shown in Figure 2. Slidably received for longitudinally guided movements in the channel members 22, is the bottom flanged base 24 of the magneto support 26. The support 26 comprises a vertical standard rising from the base portion 24 which standard is provided with a circular aperture 28 and a pair of bores 30 by means of which a magneto 32 may be seated thereon and retained as by bolts or the like 34 engaging the magneto casing through the bores 30. The armature shaft of the magneto, not shown, is intended to extend through the circular aperture 28, whereby the customary coupling plate 36 carried upon the end of the magneto shaft may be selectively engaged with a tongue coupling plate 38, carried by a driving shaft 40.

A bracket 42 is attachably secured as at 44 at a suitable position upon the base plate 12 and is provided with a plurality of spark-gaps designated generally at 46 which are adapted for connection by suitable conductors not shown with the conventional binding posts of the magneto, for testing the timing and strength of the magneto in a conventional manner.

Adjacent the front end of the base plate 12 is detachably secured in a manner to be laterally adjustable of the base 12, a gearing support consisting of a vertical supporting plate 48 having a base flange 50 slotted as at 52 for lateral adjustments upon the base 12 and retained by a plurality of fastening bolts 54 extending through the slots 52 and threadedly engaging suitable threaded bores 56 in the base plate.

As so far described, it will thus be seen that a magneto when mounted upon the supporting bracket 26, may be readily adjusted longitudinally of the supporting base 12, while the gearing support 48 may be laterally adjusted of the same base whereby various types and sizes of magnetos may be accommodated upon the testing machine.

Attention is next directed more specifically to Figures 4 and 5 for a better understanding of the driving mechanism rotating the magnetos. Upon the front surface of the gearing support plate 48, is rotatably mounted a pair of meshing gears 58 and 60, journaled upon the bearing portion 62 of the stub axle having a headed portion 64 and a screw threaded portion 66 adapted for detachable engagement in screw threaded bores 68 and 70 on the support plate. As shown in 72, the headed portion 64 may be provided with a kerf or slot for detachably securing the stub axle to the support plate.

Preferably the lowermost gear 60 is attached to the driving shaft 40, the latter being supported in a suitable boss 74 mounted upon the rear surface of the support plate 48.

Alternatively, the gear 58 only may be mounted upon the detachable stub axle 62 as above mentioned, while the gear 60 may be integrally formed with the driving shaft 40, whereby the gear and driving shaft are journaled in the bushing or boss 74 extending from the rear surface of the gearing support plate 48.

It is a feature of this invention that a driving gear may be selectively and alternatively connected to the gears 58 and 60 in order to drive the gear 60 and driving shaft 40 in reverse directions, upon a uni-directional rotation of the driving gear. For this purpose, the support plate 48 is provided with a pair of vertically aligned screw threaded bores 76 and 78 respectively, see Figure 2, which are adapted to selectively receive the screw threaded extremity 80 of the stub axle having a journal portion 82 and a headed portion 84. A driving gear 86 is rotatably mounted upon the journal portion 82 and has a forwardly extending hub portion 88 upon which is rigidly engaged the split clamped end 90 of a crank arm 92 having an operating handle 94. As shown in 96, both of these are provided for clamping the split end of the handle rigidly upon the hub of the gear 86, for rotating the same upon the journal 82.

The arrangement is such that when the stub axle 82 is mounted in the uppermost bore 76, the driving gear 86 is in mesh with the idler 58 which in turn drives the driving gear 60 and the driving shaft 40. Alternatively, when the stub axle 82 is supported in the lower bore 78, the driving gear 86 is in mesh with the lower gear 60 the upper gear 58 running idle, whereby the same directional rotation of gear 86 and handle 94 will serve to rotate the driving shaft 40 in a reversed direction from that of the previous arrangement. It will thus be seen that it is merely necessary to unscrew the head 84 of the stub axle 82, and selectively raise or lower the stub axle and the driving gear 86 journaled thereon, to selectively mount the gear in the center of the bores 76 and 78.

A gear housing or casing comprising a cover 98 is detachably connected as by fastening screws 100 to the front surface of the support plate 48 to constitute a guard for protecting and enclosing the driving gear. This cover is centrally cut away as at 102 to provide clearance for the rotation of the hub 88 and clamp 90 of the handle 92. The cover plate is further provided as indicated in dotted lines in Figure 2, with a longitudinally extending slot 104 of sufficient dimension and suitably positioned to allow raising and lowering of the stub axle 82 therein for selectively positioning the latter in the support bores 76 and 78. It will thus be seen that the head 84 of the stub axle may be manipulated from outside the cover 98, and that the stub axle, handle and gear 86 may be moved as a unit within the slot 104 to properly position the driving gear 86. This adjustment may be made without removing the cover 98 from the gearing assembly.

From the foregoing it is believed that the manner of operating the device will be readily understood. Various types of magnetos may be adjustably mounted upon the base, and detachably connected in driving relation to the shaft 40, whereby they may be operated by the handle 92 and above described gearing. Any suitable gear ratios may be provided for operating the magnetos at any desired speed. Obviously, the interchangeably gearing permits driving right or left hand magnetos, from a uni-directional rotation of the operating handle 94.

Although the principles of this invention have been shown applied to a manually operable magneto drive gearing, it will be readily understood that motor operating means may be employed. However, the manual operating means seem to be extremely beneficial, since magnetos may be rotated at relatively slow and relatively fast speeds by the same gearing, for conducting various tests thereon.

It should be noted that this device is extremely portable in its nature, and has all of the necessary magneto supporting, driving and testing elements, supported upon a single stand whereby the apparatus may be readily transported and applied to different makes of magnetos for testing the same. Moreover, the magneto support, the testing indicator and the gearing support may be readily removed from the stand in order to facilitate compact storage and transportation of the device.

Since numerous modifications will readily occur to those skilled in the art after consideration of the accompanying specification and claims it is not intended to limit the invention to the exact construction shown and described, but all suitable modifications may be resorted to falling in the scope of the intended claims.

What is claimed as new is as follows:

1. A magneto testing stand comprising a base, a magneto support on said base, a gearing support on said base, a pair of meshing gears journaled on said support, one of said gears having a detachable coupling for driving the shaft of a magneto carried by said magneto support, a driving gear selectively engageable with one of said meshing gears for reversibly driving said coupling, a stub axle upon which the driving gear is journaled, and a pair of bores on said gearing support for selectively receiving said stub axle, said bores being so located as to position said stub axle to mesh said driving gear with a corresponding one of said pair of gears.

2. The combination of claim 1 and means whereby said magneto support is longitudinally adjusted on said base.

3. The combination of claim 2 wherein said means includes laterally spaced, longitudinal guide channels on said base, said magneto support being slidably retained in said channels.

4. The combination of claim 1 and means whereby said gearing support is laterally adjusted on said base.

5. The combination of claim 4 wherein said means includes a base flange having a plurality of slots laterally spaced therein, externally threaded lugs on said base extending through said slots, and a plurality of internally threaded sleeves carried by said lugs.

CHARLES G. ABBOTT.

REFERENCES CITED

The following references are of record in the file of this patent:

UNITED STATES PATENTS

| Number | Name | Date |
|---|---|---|
| 676,131 | Hartman | June 11, 1901 |
| 898,682 | Riffle | Sept. 15, 1908 |
| 1,381,686 | Whigelt | June 14, 1921 |
| 1,536,081 | Dean | May 5, 1925 |
| 1,891,847 | Stroedter | Dec. 20, 1932 |
| 2,446,645 | Flinchbaugh | Aug. 10, 1948 |